(12) United States Patent
Lau et al.

(10) Patent No.: US 12,399,381 B2
(45) Date of Patent: Aug. 26, 2025

(54) GLASSES FOR RETARDING MYOPIA PROGRESSION

(71) Applicants: Chun Ho Lau, Shanghai (CN); Chun Put Lau, Hong Kong (CN)

(72) Inventors: Chun Ho Lau, Shanghai (CN); Chun Put Lau, Hong Kong (CN)

( * ) Notice: Subject to any disclaimer, the term of this patent is extended or adjusted under 35 U.S.C. 154(b) by 671 days.

(21) Appl. No.: 17/636,744

(22) PCT Filed: Aug. 18, 2020

(86) PCT No.: PCT/CN2020/109664
§ 371 (c)(1),
(2) Date: Feb. 18, 2022

(87) PCT Pub. No.: WO2021/032070
PCT Pub. Date: Feb. 25, 2021

(65) Prior Publication Data
US 2022/0291523 A1 Sep. 15, 2022

(30) Foreign Application Priority Data
Aug. 19, 2019 (CN) .......................... 201910765029.1

(51) Int. Cl.
*G02C 5/20* (2006.01)

(52) U.S. Cl.
CPC ........... *G02C 5/20* (2013.01); *G02C 2202/24* (2013.01)

(58) Field of Classification Search
CPC .. G02C 5/20; G02C 2202/24; G02C 2200/18; G02C 2200/26
See application file for complete search history.

(56) References Cited

U.S. PATENT DOCUMENTS 2,730,014 A * 1/1956 Ivanoff .................. G02B 13/00
396/25
3,510,208 A * 5/1970 Watkins ................... G02C 5/20
403/372

(Continued)

FOREIGN PATENT DOCUMENTS

CN 2049368 U 12/1989
CN 201673335 U * 12/2010

(Continued)

OTHER PUBLICATIONS

Richard A. Weiss et al., Clinical Importance of Accurate Refractor Vertex Distance Measurements Prior to Refractive Surgery, 18 Journal of Refractive Surgery 444-448 (2002). (Year: 2002).*

(Continued)

*Primary Examiner* — Thomas K Pham
*Assistant Examiner* — Wesley Scott Ashton
(74) *Attorney, Agent, or Firm* — Lando & Anastasi, LLP

(57) ABSTRACT

Glasses for retarding myopia progression is provided, and include a frame (10) and glasses legs. Each of the glasses legs includes a first leg (19) and a second leg (21). The second leg (21) is connected between the frame (10) and the first leg (19), the second leg (21) is movable telescopically in relation to the first leg (19). In movement of the frame (10) relative to eyeballs (100, 200) from a primary position to a secondary position stretched, a relationship between an effective degree and a lens degree is denoted by: $P_2 = P_1/(1-d_2 P_1)$. $P_1$ is an actual lens degree at the primary position, $P_2$ is an effective lens degree at the secondary position, and $d_2$ is a spacing between the primary position and the secondary position, the spacing meets: $0 < d_2 < 60$ mm.

1 Claim, 12 Drawing Sheets

(56) References Cited

U.S. PATENT DOCUMENTS

| | | | | |
|---|---|---|---|---|
| 3,705,761 | A * | 12/1972 | Fujisawa | G02C 5/20 351/119 |
| 5,033,837 | A | 7/1991 | Leonardi | |
| 5,347,325 | A | 9/1994 | Lei | |
| 6,076,927 | A * | 6/2000 | Owens | G02C 5/10 351/41 |
| 7,971,993 | B2 * | 7/2011 | Kawamoto | G02C 1/023 351/110 |
| 8,857,986 | B2 * | 10/2014 | Fischer | A61B 3/11 351/41 |
| 9,213,178 | B1 * | 12/2015 | Giri | G02B 27/0172 |
| 9,239,470 | B2 * | 1/2016 | Vossoughi | G02C 5/2263 |
| 9,709,818 | B1 * | 7/2017 | Chen | G02C 1/02 |
| 10,488,675 | B2 * | 11/2019 | Wildsmith | G02C 7/021 |
| 2002/0131014 | A1 * | 9/2002 | Yue | G02C 5/2227 351/113 |
| 2006/0279692 | A1 * | 12/2006 | Bruck | G02C 5/2272 351/41 |
| 2008/0284975 | A1 * | 11/2008 | Negishi | G02C 5/2263 351/118 |
| 2010/0103367 | A1 * | 4/2010 | Lee | G02C 5/22 351/121 |
| 2014/0168599 | A1 * | 6/2014 | Vossoughi | G02C 5/20 351/120 |
| 2016/0054585 | A1 * | 2/2016 | Alcini | G02C 5/2263 351/115 |
| 2018/0129069 | A1 * | 5/2018 | Perdichizzi | G02C 5/143 |
| 2019/0235270 | A1 * | 8/2019 | Seki | G02C 5/04 |
| 2022/0146857 | A1 * | 5/2022 | Hones, Jr. | B29D 11/00009 |

FOREIGN PATENT DOCUMENTS

| | | | | |
|---|---|---|---|---|
| CN | 201955565 | U | | 8/2011 |
| CN | 103424888 | A * | | 12/2013 |
| CN | 204143083 | U * | | 2/2015 |
| CN | 204331177 | U | | 5/2015 |
| CN | 204360040 | U | | 5/2015 |
| CN | 109143613 | A * | 1/2019 | G02C 5/08 |
| CN | 210294714 | U * | 4/2020 | G02C 5/20 |
| EP | 3531193 | A1 * | 8/2019 | G02C 5/2227 |
| JP | 1994118352 | A * | 4/1994 | |
| JP | 2008122432 | A * | 5/2008 | |
| KR | 20130003598 | A * | 1/2013 | |
| WO | WO2000063739 | A1 * | 10/2000 | |
| WO | WO-0106298 | A1 * | 1/2001 | G02B 27/017 |

OTHER PUBLICATIONS

Andrew Bruce, The Well-Adjusted Frame, Using Fitting Techniques to Enhance Eyewear Technology, 2010, pp. 1-5 [online], [retrieved Aug. 2, 2024], retrieved from the Internet <URL: https://www.2020mag.com/article/the-well-adjusted-frame>. (Year: 2010).*

Health Hack: How to Select Properly-Fitting Eyeglasses, 2016, pp. 1-7 [online], [retrieved Aug. 2, 2024], retrieved from the Internet <URL: https://www.onesickvet.com/health-hack-how-to-select-properly-fitting-eyeglasses/>. (Year: 2016).*

Rare Vintage Rhinestone Eyeglasses Sunglasses Frame, 2018, one page [online], [retreived Aug. 4, 2024], retrieved from the Internet <URL: https://www.bing.com/images/search?view=detailV2&ccid=0PmjOFeh&id=0CEBE55652919B1AAC82EB639689CFB107E534B7&thid=OIP.0PmjOFehsFxHNSqx2D3RigHaFR&mediaurl=...>. (Year: 2018).*

Is a rectangle a square? Is it always or sometimes or never?, 2018, one page [online], [retrieved Aug. 5, 2024], retrieved from the Internet <URL: https://socratic.org/questions/is-a-rectangle-a-square-is-it-always-or-sometimes-or-never>. (Year: 2018).*

Julie Tyler et al., Myopia Treatments: How to Choose and When to Use?, 2019, pp. 1-13 [online], [retrieved Aug. 1, 2024], retrieved from the Internet <URL: https://www.reviewofoptometry.com/article/myopia-treatments-how-to-choose-and-when-to-use>. (Year: 2019).*

Overview of Eyewear Temple Designs and Mechanics to Arrest Glasses Slippage, 2019, pp. 1-9 [online], [retrieved Aug. 1, 2024], retrieved from the Internet <URL: https://betasimplicity.com/article_1907021_templedesignslippage.html>. (Year: 2019).*

Vertex Distance, 2020, pp. 1-13 [online], [retrieved Aug. 2, 2024], retrieved from the Internet <URL: https://opticianworks.com/lesson/vertex-distance/>. (Year: 2020).*

Easier English Student Dictionary 699 (2003). (Year: 2003).*

Chris Coffin et al., Interactive Perspective Cut-away Views for General 3D Scenes, 2006, pp. 25-28 [online], [retrieved Oct. 25, 2025], retrieved from the Internet <URL: https://ieeexplore.ieee.org/stamp/stamp.jsp?tp=&arnumber=1647502>. (Year: 2006).*

Jessica Jarossz et al., Adaptive Eyeglasses for Presbyopia Correction: an Original Variable-focus Technology, 27 Optics Express 10533-10552 (2019). (Year: 2019).*

International Search Report and Written Opinion from corresponding PCT/CN2020/109664 dated Nov. 24, 2020.

* cited by examiner

GLASSES FOR RETARDING MYOPIA PROGRESSION

CROSS REFERENCE TO RELATED APPLICATION

This patent application is a national stage application of International Patent Application No. PCT/CN2020/109664 filed on Aug. 18, 2020, which claims priority of Chinese Patent Application No. 201910765029.1 filed on Aug. 19, 2019, which is incorporated by reference herein in its entirety as part of the present application.

TECHNICAL FIELD

The present invention relates to glasses, particularly glasses for retarding myopia progression.

BACKGROUND ART

Myopia is defined as when the ciliary muscle within the eye responsible for focusing accommodation is at its most physical relaxation level and distant objects are focused in front of the center of the retina. The blurry image of distant objects not only causes visual impairment but may also lead to serious complications such as glaucoma, retinal detachment and macular degeneration, thereby causing the consequence of blindness. The more progressed myopia, the more likely the development of blindness. Myopia is caused by too much reading or too short distance kept in reading, which leads to the spasm of the focusing accommodation and continuous contraction of the extraocular intortor, and thus to cause the excessive elongation of the axis of eyeball (causing true myopia and rapid growth in myopic degrees). Reading control is thus crucial for preventing the generation and progression of myopia.

In the reading process, the ciliary muscle of the eye contracts to change the shape of the crystalline lens, so as to achieve the eye focus (accommodation), whereas the extraocular intortor contracts (primarily by the intortor and secondarily by superior and inferior rectus muscles) to obtain the binocular single image.

Progression in the degree of myopia is essentially caused by elongation of the axial length of eyeball. Inhibiting elongation of the axial length of eyeball can thus prevent progression in the degree of myopia. Among existing technologies, the myopic defocus applied on peripheral retina can inhibit the elongation of the axis of eyeball, thereby in some extent, retarding the progression of the degree of myopia.

When a patient wears myopia glasses (to correct distant eyesight) to read, the spasm of focusing accommodation of the intraocular ciliary muscle and the contraction of the extraocular intortor are constantly at work, causing tremendous pressure on eyeballs. Such a tremendous pressure can cause the spasm of the focusing accommodation, and excessive elongation of the axis of eyeball due to stretch resulting from the contraction of the extraocular intortor, thereby causing or worsening myopia. If the situation is not effectively inhibited, myopia can continue to be worsened.

Generally, typical patients who wear eyeglasses can undoubtedly take off their glasses to read because the reading matter is close to their eyes in reading. However, if the patients do so, the inconveniences and drawbacks are as follows.

(a) When astigmatism (common) is present, the absence of glass lenses means a lack of correction over the refractive error, thereby leading to blurred image.
(b) With a high degree of myopia, for example, over 400 degrees, he must bend forward, thereby causing the back strain and a strong sense of discomfort. A short reading distance also strains of the extraocular intortor. Meanwhile, the physiological mechanism of pupillary accommodation reflex also causes increased accommodation, thus leading to increase myopia.
(c) In case where the degree of myopia is not too high, even though the reading distance is not as short as that of (a), the reader cannot enjoy the effect of retarding the progression of myopia if glasses of this disclosure were not worn.
(d) When a myopia patient wants to see distant objects, he needs to wear glasses, which prompts his eyes to readjust the focusing accommodation and the work of extraocular intortor. When he wants to see nearby objects, he has to take off the glasses and then readjust the focusing accommodation and the work of extraocular intortor to adapt. The repeated wearing, taking off and reaccommodation practices are definitely inconvenient and more likely to cause eyestrain.
(e) When one reads electronic screens (e.g., PCs and mobile phones), LEDs screen emitting blue light, or under sunlight without wearing blue-light protective glasses, the excessive harmful blue light is not blocked and thus can harm eyes and physiological health over time.

Additionally, myopic correction methods that do not have a retarding effect on the progression of myopia include as follows.

First, the simple myopic lens is used to correct which does not have a true retarding effect on the progression of myopia and thus indeed to causes increasing myopic degree.

Second, orthokeratology laser procedure does not retard the progression of myopia, and can cause glare, xerophthalmia and infection. Further, a rebound of myopic degree a few years after the surgery is common. The risk of retinal breaks and detachment is also increased.

Third, alternation of two sets of glasses is adopted, with one set for seeing distant objects and the other for nearby objects. Specifically, glasses for seeing nearby objects reduce the eye's focusing accommodation and slow down the progression of myopia. The drawbacks thereof include inconvenience, high costs and low compliance, as well as poor reading adaptability of glasses, with overlapped prism lenses, for seeing nearby objects.

Fourth, a part of bifocal lens which sees nearby objects is used to relax the focusing accommodation to prevent progression of myopia. However, the bifocal lenses have the shortcomings of low acceptability of their appearance, inconvenience when being used to view desktop computers, and poor adaptability of the bifocal lenses when being worn during sports or when overlapped with the prism lenses for nearby objects.

Fifth, peripheral defocus lenses. When a myopia patient wears common prescription glasses, only middle scenes in the instant line-of-sight distance are focused on the central retina, while the peripheral scenes are actually focused behind the retina (hyperopic defocus phenomenon). The myopic degrees on both sides of a peripheral defocus lens are smaller than that of the central part thereof. Thus, when such lenses are worn, the surrounding scenes will be focused in front of the peripheral retina, thereby offsetting the eye's congenital defect of peripheral defocus in the case of far sight. Thus, excessive elongation of the axial length of eyeball is prevented and the progression of myopia is retarded. The shortcoming is that the reading process is not controlled and a retarding effect on the progression of myopia is not significant.

Sixth, a part of progressive lens which sees nearby objects is used to relax the focusing accommodation, so as to prevent myopia progression. The drawback is that young myopic patients may not find and use the most appropriate part of the lenses for seeing the nearby objects, thereby influencing the effects. Optical distortion on lens edges can cause discomfort, and thus the part for seeing nearby objects can not be separately overlapped with prism lenses.

Seventh, a drug is applied to paralyze the ciliary muscle and the bifocal lens or progressive lens is worn. The wearer's pupil is dilated by the drug and the focusing accommodation ability is decreased, thus the focusing accommodation ability of the bifocal lenses or the progressive lenses is deficient and decreased, thereby helping reduce myopia progression. The drawbacks thereof are glare, rapid heartbeat, fever, dry eyes and dry mouth; and long-term use may result in the entry of harmful ultraviolet light into the eyeballs, thereby leading to retinal and macular degeneration. A lower concentration of atropine for paralyzing the ciliary muscle still has toxicity. The toxicity of the latest ultra-low concentration (0.01%) of atropine remains to be seen, whereas its treatment efficacy is unsatisfactory.

Eighth, orthokeratology lenses that are worn at night can somewhat flatten the myopic patient's cornea curvature, for correcting myopia and reducing myopia progression. Due to its invasiveness, the corneal surface is easy to be broken, ulceration and infected, and keratoconus can happen as well.

To sum up, traditional myopia correction methods have many drawbacks and are not reliable or safe enough to use. With a growing myopic population, it is increasingly pressing to find a more convenient and safer approach to the problem.

SUMMARY

It should be understood that the foregoing general descriptions and ensuing detailed descriptions of this disclosure are exemplary and explanatory, and intended to providing further explanations for this disclosure as mentioned in the claims.

To overcome the above problems, the present disclosure provides glasses for retarding myopia progression, which includes a frame and glasses legs, wherein each of the glasses legs comprises a first leg and a second leg, the second leg is connected between the frame and the first leg, the second leg is movable telescopically in relation to the first leg, in movement of the frame relative to eyeballs from a primary position to a secondary position stretched, a relationship between an effective degree and a lens degree is denoted by:

$$P_2 = P_1/(1-d_2 P_1)$$

Wherein $P_1$ is an actual lens degree at the primary position, $P_2$ is an effective lens degree at the secondary position, and $d_2$ is a spacing between the primary position and the secondary position, the spacing meets:

$$0 < d_2 < 60 \text{ mm}$$

In some embodiments, the present disclosure further provides glasses for retarding myopia progression.

The first leg may include a plughole arranged at a front end of the first leg, the second leg may be telescopically arranged at a first end of the plughole.

In some embodiments, the present disclosure further provides glasses for retarding myopia progression.

The glasses further may include a movable body, the movable body may be embedded at a second end of the plughole. The second leg may be arranged within the plughole and connected to the movable body.

In some embodiments, the present disclosure further provides glasses for retarding myopia progression.

A plurality of grooves may be formed longitudinally and parallelly in the plughole. A plurality of first parallel ribs may be formed longitudinally in an insertion head end of the movable body. Each of the first ribs and a corresponding one of the grooves may be engaged with each other.

In some embodiments, the present disclosure further provides glasses for retarding myopia progression.

An insertion tail end of the movable body may be provided with a plurality of concave-convex stripes and a operating portion of which a shape may be a convex and transversal stripe.

In some embodiments, the present disclosure further provides glasses for retarding myopia progression.

The movable body may include intermeshed rack and pinion, an accommodation knob arranged on a side face of the first leg may be capable of rotating to drive the pinion to rotate, such that the rack of the movable body may be moved and a relative spacing between the first leg and second leg may be telescopically adjusted.

In some embodiments, the present disclosure further provides glasses for retarding myopia progression.

The plughole further may include a spring, a telescopic body, a turntable, a push rod and a chute. The telescopic body may be connected with the second leg as a whole, a width of the telescopic body may be larger than a width of an opening of the plughole. The spring may be sleeved on the telescopic body, an end of the telescopic body may be sleeved with the turntable. An outer circumferential surface of the turntable may be provided with a plurality of parallel second ribs along a central axis of the turntable. A first end of the push rod may be sleeved within the chute and protruding out of an opening of the chute, a second end of the push rod may abut against the turntable. The chute may be arranged with a plurality of one-way open and parallel chute openings. A head of the push rod may be provided with a plurality of pointy protrusions, and a concave-convex meshing structure may be provided on opposite surfaces of both the chute and the turntable.

By pressing the push rod protruding out of an end of the plughole, the push rod may move along the chute to force the turntable to move downward. When the turntable and the chute may be detached at a meshing position, the pointy protrusions at the head of the push rod may contact with an oblique plane of the turntable to generate a radial force, so as to drive the turntable to rotate. The telescopic body abutting against one end of the turntable may be compressed, the spring outside the turntable may be in a compressed state, the frame is in the primary position. When the push rod may be pressed again, the pointy protrusions of the head of the push rod may be detached from the oblique plane of the turntable. The turntable may rotate under the radial force, the turntable and the chute may be overlapped at the meshing position. Along with a stretching of the spring, the frame may reach the secondary position.

In some embodiments, the present disclosure further provides glasses for retarding myopia progression.

A plurality of recesses may be formed at outer side edges of both a left lens and a right lens, a range of a depth d of each of the recesses may be:

70 mm<d<100 mm.

In some embodiments, the present disclosure further provides glasses for retarding myopia progression.

The recesses may be formed along a central horizontal baseline of both the left lens and the right lens on the outer side edges of the left lens and the right lens.

In some embodiments, the present disclosure further provides glasses for retarding myopia progression.

A cross-sectional shape of the plughole may include rectangle, circle and ellipse.

By adopting the glasses for retarding myopia progression in the embodiment, through the telescopic manner, comfortable and safe accommodation of the degree of myopia is achieved by a pair of glasses, and the use of the glasses is simple and the cost thereof is low.

BRIEF DESCRIPTION OF THE DRAWINGS

Hereinafter, exemplary embodiments of the present disclosure will be described in detail with reference to the accompanying drawings. Hereinafter, preferred embodiments of the present disclosure will be referred in detail, examples of which are illustrated in the accompanying drawings. Wherever possible, the same reference numbers will be used throughout the drawings to refer to the same or similar parts. In addition, although the terms used in this disclosure are selected from publicly known and used terminologies, some terms mentioned in the public disclosure may have been selected by the applicant based on his or her discretion, the detailed definitions of which are explained in other descriptive parts of this text. Further, it is required that the present disclosure be understood not only by terms actually used but by the meaning implied by each term.

Numerous purposes, features and advantages of the present disclosure will be readily apparent to those of ordinary skill in the art upon a reading of the following detailed description of the present disclosure.

Figure 1:
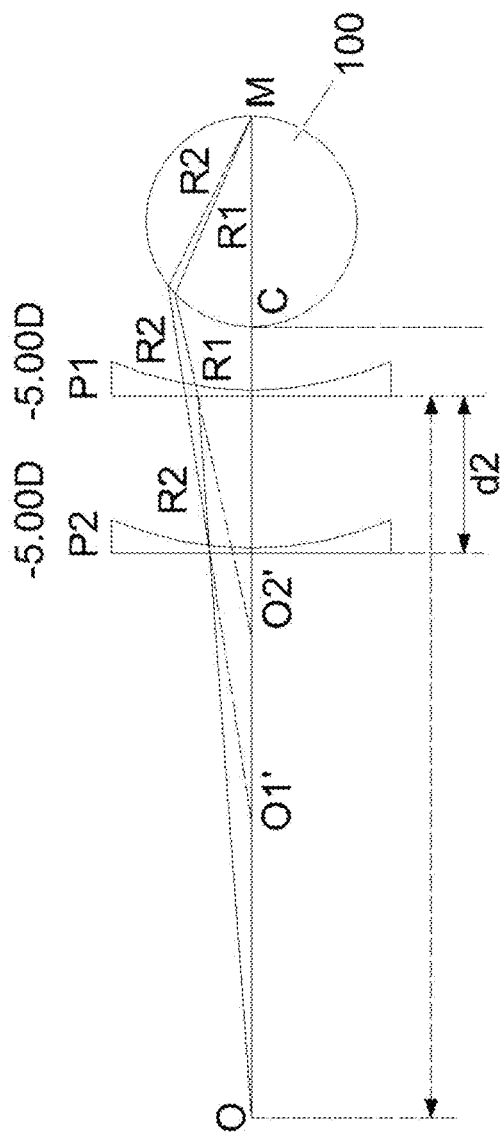
FIG. 1 is a schematic working principle diagram of special glasses according to the present disclosure.

List of the reference characters: 10 front frame; 11 hinge; 12 plughole; 13 first rib; 14 groove; 15 concave-convex stripe; 16 operating portion; 17 glass handle; 18 movable body; 181 insertion head end; 182 insertion tail end; 19 first leg; 20 ear pad; 21 second leg; 22 nose pad; 301 right lens; 302 left lens; 81 accommodation knob; 82 rack; 83 pinion; 90 spring; 91 telescopic body; 92 turntable; 93 push rod; 94 chute; 921 second rib; 941 opening; 942 chute notch; 100 first eyeball; and 200 eyeball.

DETAILED DESCRIPTION OF THE EMBODIMENTS

This description discloses one or more embodiments incorporating the features of the present disclosure. The disclosed embodiments only exemplify the present disclosure. The scope of the present disclosure is not limited to the disclosed embodiments. The present disclosure is defined by the attached claims.

References in the description to "one embodiment," "an embodiment," "an exemplary embodiment," etc. indicate that the described embodiment may include a particular feature, structure, or characteristic, but not all embodiments necessarily include the particular feature, structure, or characteristic, structure or properties. In addition, these terms may not necessarily refer to the same embodiments. Further, when a particular feature, mechanism or characteristic is described in connection with one embodiment, it is considered within the knowledge of those skilled in the art to implement such feature, structure or characteristic in connection with other embodiments, whether explicitly described or not.

Additionally, it should be understood the spatial descriptions (e.g., above, below, on top of, left, right, beneath, top, bottom, vertical, horizontal, etc.) used herein are only for descriptive purposes, and the actual structural implementation method described herein can be spatially arranged in any orientation or manner.

FIG. 1 is a schematic diagram of working principle of the present disclosure, indicating how the front-and-back movement of a front frame 10 of myopic lens improves the degree of myopic degree.

The reference signs in the diagram have the following meanings. C denotes a central corneal surface; $d_1$ denotes a distance from C to $P_1$ at a primary position; $d_2$ denotes a distance of $P_1$ at the primary position and $P_2$ at the secondary position, and d2=6 cm; O denotes book reading; $O_1'$ denotes book vision seen by eyes when the lenses are in the primary position; $O_2'$ denotes book vision seen by eyes when the lenses are in the secondary position; $P_1$ denotes lenses at the primary position; $P_2$ denotes lenses at the secondary position; $R_1$ denotes light that has traveled through $P_1$; $R_2$ denotes light that has traveled through $P_2$; and 100 denotes a first eyeball;

As can be seen from the embodiment shown in FIG. 1, when the first leg 19 and second leg 21 of the myopia glasses relatively move from each other, the primary position $P_1$ and secondary position $P_2$ of lenses in relation to the cornea are generated.

The spacing between the primary position and the secondary position, and the implementable accommodation of myopic degree have the following relationship. That is, the following explains in detail the effect of the adjustable glasses of the present disclosure in use process.

First, the parameters applied are explained as follows.

$f_1$=focal length of lens (unit: meter).

$f_2$-effective focal length of lens (unit: meter).

Vertex distance=distance between the backside of the lens and the central corneal surface.

$d_2$=change in vertex distance (only denotes differences without considering direction, which means it always has a positive value).

Unit of $d_2$: meter.

$P_1$=degree of lens [myopia lens is denoted by a minus sign (−)], unit: D (Diopter).

$P_2$=effective degree of lens [myopia lens is denoted by a minus sign (−)], unit: D (Diopter).

Reading distance is L (meter), and accommodation coefficient is a, which satisfied: 1>a>0.

Where, the relationship between the above parameters is defined by the following equation.

The effective focal length of lens is denoted by the equation:

$$f_2 = f_1 - d_2 \tag{1}$$

The effective focal length of lens is denoted by the equation:

$$f_2 = 1/P_2 = 1/P_1 - d_2 \tag{2}$$

Where, the effective focal length of lens is denoted by the equation:

$$1/P_2 = (1 - d_2 P_1)/P_1 \tag{3}$$

Then, the effective focal length of lens is denoted by the equation:

$$P_2 = P_1/(1 - d_2 P_1) \tag{4}$$

Where d2 denotes a forward movement distance from central corneal surface, which is of positive value; thus $1 - d_2 P_1$ is also positive value;

$d_2$=aL denotes a distance the reduction in the number of degrees needed to be adjusted due to the forward movement of the lens from the central corneal surface, Where, $d_2$ is denoted by the equation:

$$60 \text{ mm} > d_2 > 0 \text{ mm} \tag{5}$$

The embodiment incorporating the above relationships has the following relationship:

If the −5D lens moves from the primary position $P_1$ forward by 60 mm to the secondary position $P_2$, Based on equation (4), the effective lens degree is denoted by the equation:

$$p_2 = \frac{p_1}{1 - d_2 p_1}$$
$$= \frac{-5}{1 - [0.06 \times (-5)]}$$
$$= \frac{-5}{1.3} = -3.85D$$

As such, the glasses of the present embodiment change the effective lens degree through lens forward movement. When the front frame 10 of myopia lens moves forward by 60 mm, the myopia degree is adjusted from the −5D at the primary position to −3.85D, thus resulting in a decrease in degrees by +1.15D.

Figure 2:
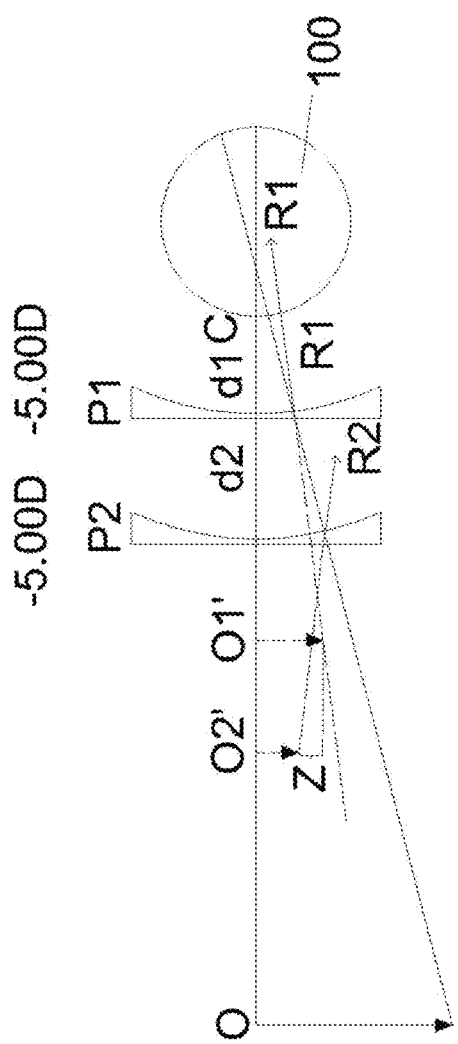
FIG. 2 shows a specific embodiment based on the working principle shown in FIG. 1.

FIG. 2 shows that both eyes do not need to look relatively much downward to read and observe objects when the lenses are in the secondary position (in relation to the primary position) without considering accommodation. That is because the vision at the lower end is lifted, reducing the workload of extraocular muscles. Because the more straight the eyes look forward, the more balanced the tension of each extraocular muscle.

FIG. 2 further illustrates that after the front frame and myopia lens move forward, the light on the book will be affected by the lenses that have moved forward, producing a base-down prism effect and causing the book to seem to have moved a little upward, thereby effectively reducing the necessity of downward-looking or head lowering.

The reference signs in FIG. 2 have the following meanings. C denotes a central corneal plane; $d_1$ denotes a distance from C to $P_1$ at the primary position; d2 denotes a distance from $P_1$ at the primary position to $P_2$ at the secondary position; $O_1'$ denotes the vision in book reading seen by eyes when the lenses are at the primary position; $O_2'$ denotes the vision in book reading seen by eyes when the lenses are at the secondary position; $P_1$ denotes lenses at the primary position; $P_2$ denotes lenses at the secondary position; $R_1$ denotes light that has traveled through primary position P1; $R_2$ denotes light that has traveled through secondary position $P_2$; Z denotes height difference; and 100 denotes first eyeball.

Figure 3:
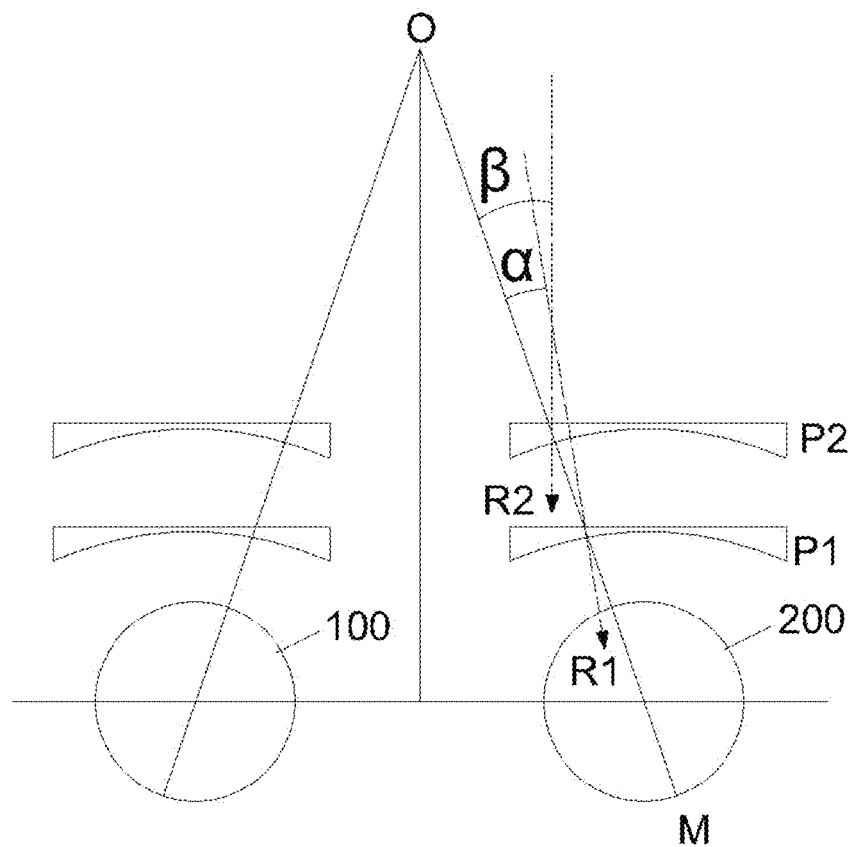
FIG. 3 is a schematic diagram of binocular observation when the special glasses of the present disclosure are used.

FIG. 3 provides a top view of the special glasses of the present disclosure in use.

Wherein the first eyeball 100 and eyeball 200, the primary position $P_1$ and secondary position $P_2$ of lenses are presented.

As can be known from the figure, when the front frame and myopia lenses are moved forward, light on the book will be affected by the lenses that have moved forward, producing a base-in prism effect. As a result, the user can maintain binocular single vision without having to converge too much of his or her eyes.

The reference signs in FIG. 3 have the following meanings. C denotes a central corneal surface; O denotes reading book; $P_1$ denotes lenses are in primary position; $P_2$ denotes lenses are in the secondary position; R denotes light that has traveled through $P_1$; $R_2$ denotes light that has traveled through $P_2$; α denotes an angle of the outward shift of book vision caused by lenses at the primary position $P_1$; β denotes an angle of the outward shift of book vision caused by lenses at the secondary position $P_2$; 100 denotes first eyeball; and 200 denotes eyeball.

First Embodiment

Figure 4:
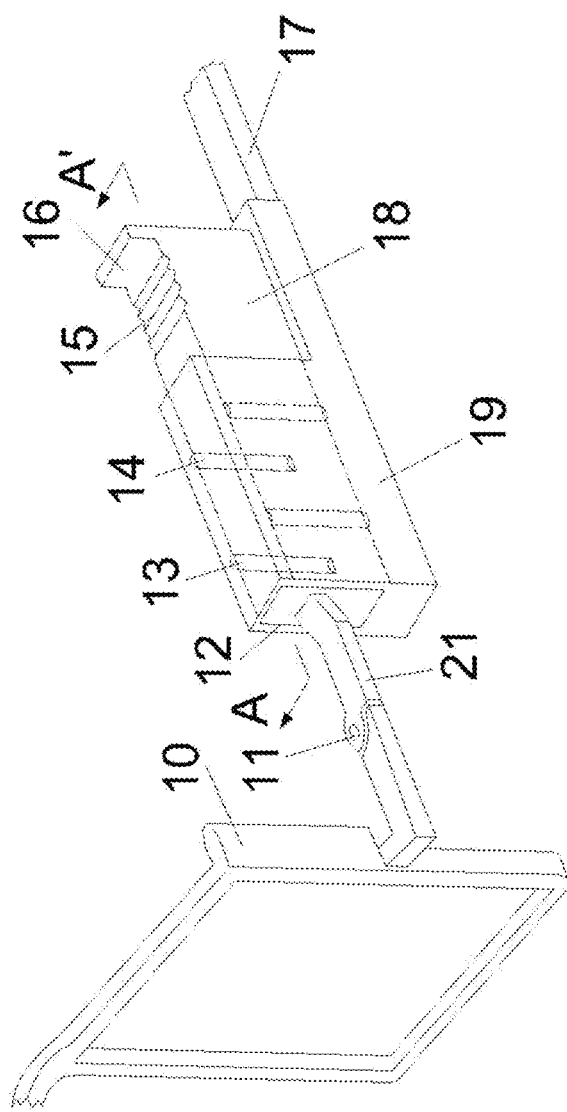
FIG. 4 is a partial schematic structural diagram in a first preferred embodiment of the present disclosure.

FIG. 4 shows a partial schematic structural diagram of the first embodiment of the present disclosure;

The glasses retarding progression of myopia provided include different shapes and types including full-rim, semi-rim and rimless front frame 10. The front frame 10 is connected to a movable body 18 through a hinge 11. The movable body 18 is able to move in relation to a first end of first leg 19. The first leg 19 is connected at its second end with an ear pad 20 via a glass handle 17.

Figure 5:
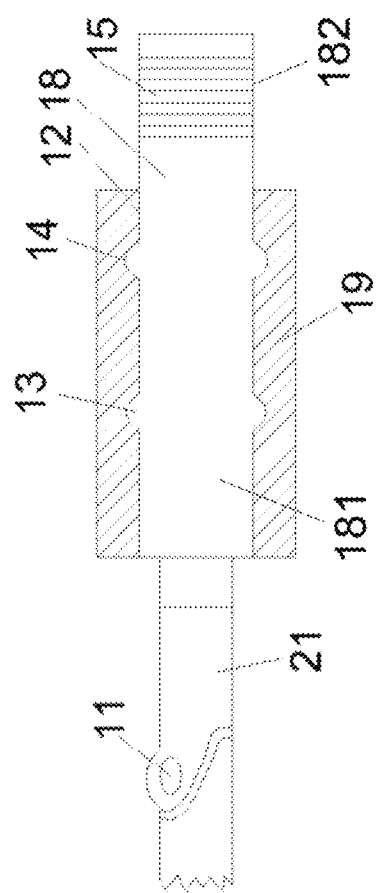
FIG. 5 is a cross-section view taken along line A-A' in FIG. 4.

Please refer to FIGS. 4 and 5 which reveal the structures of the front frame 10 and the movable body 18 in detail.

The first end of the first leg 19 is provided with a plughole 12 which has a certain length. The first end of the movable body 18 is connected to the second leg 21 which is connected to the hinge 11. The movable body 18 is movably embedded in the plughole 12.

As can be known from FIG. 5, a plurality of grooves 14 are formed longitudinally and parallelly in the plughole 12, and a plurality of first parallel ribs 13 are also formed longitudinally in an direction on the part of the movable body 18 inserted therein. Each of the first ribs 13 and a corresponding one of the grooves 14 are mutually engaged to adjust the relative spacing between the first leg 19 and the second leg 21.

Additionally, to adjust the movable body 18 more conveniently, an operating portion of which a shape is a convex and transversal stripe 16 is provided at the tail of the second end of the movable body 18, and a plurality of concave-convex stripes 15 are provided on an end face of the second end.

The movable body given in the preferred embodiment shown in the figure is a cuboid, which is not limited by this structure in practical applications and can also be an ellipsoid, a cylinder and the like.

The working mode of the first embodiment will be described below with reference to FIGS. 6 and 7.

Figure 6:
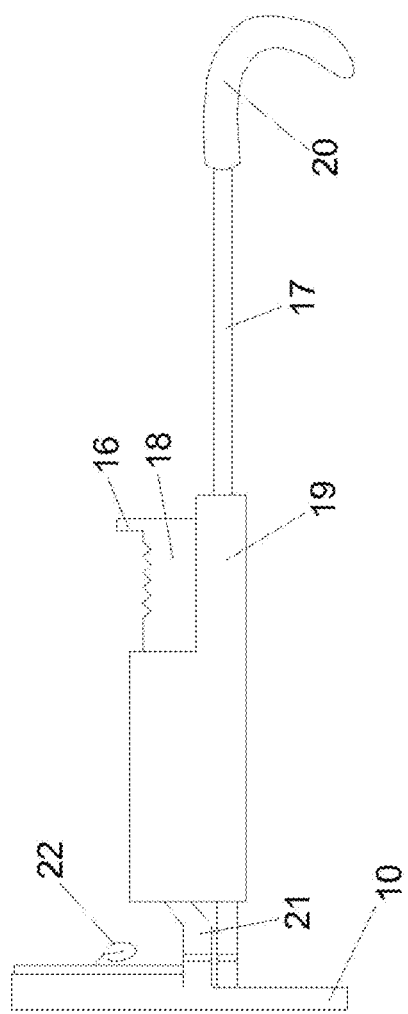
FIG. 6 is a side view of the first preferred embodiment shown in FIG. 4 at a primary position.

FIG. 6 shows the structure of the movable body 18 at the primary position.

The four upright and protruding semi-cylindrical bodies 13 parallel to the longitudinal direction of the movable body 18 are embedded longitudinally and parallelly in the semi-cylindrical grooves 14 inside the plughole 12 to form a tight locking system.

Figure 7:
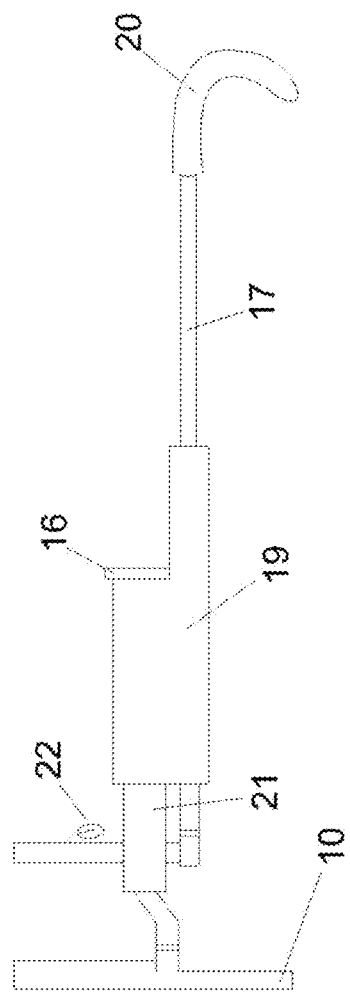
FIG. 7 is a side view of the first preferred embodiment shown in FIG. 4 at a secondary position.

FIG. 7 shows the structure of movable body 18 at the secondary position.

When the movable body 18 is pushed into the plughole 12 on the first leg 19, each of the first ribs 13 on the movable body 18 close to the operating portion 16 is pushed into corresponding one of the grooves 14 inside the plughole 12 close to the second leg 21 and locked tight.

The concave-convex stripes 15 and the operating portion 16 on the back of the movable body 18 are to help the front frame 10 and the myopia lens to move back and forth. The operating portion 16 in a shape of convex-horizontal strip is to prevent the front frame 10 and the myopia lens from sliding forward excessively and coming out from the glasses legs on both sides, in addition to facilitating the user to move the front frame and the myopia lens back to the primary position. The first leg 19 and the glass handle 17 are connected to form a horizontal line $L_3$. The horizontal line $L_3$ forms a right angle with the vertical lines of the upright head and body. The distance between the front frame 10 and the first leg 19 is about 15 mm. The first leg 19 is 40 mm long, 15 mm high and 7 mm wide.

Second Embodiment

Figure 8:
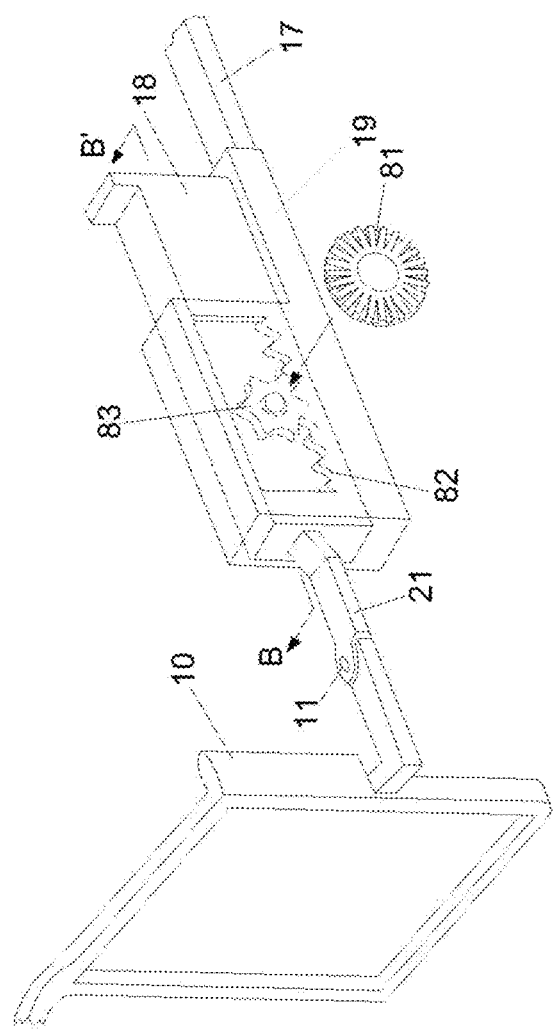
FIG. 8 is a partial schematic structural diagram of a second preferred embodiment of the present disclosure.
Figure 9:
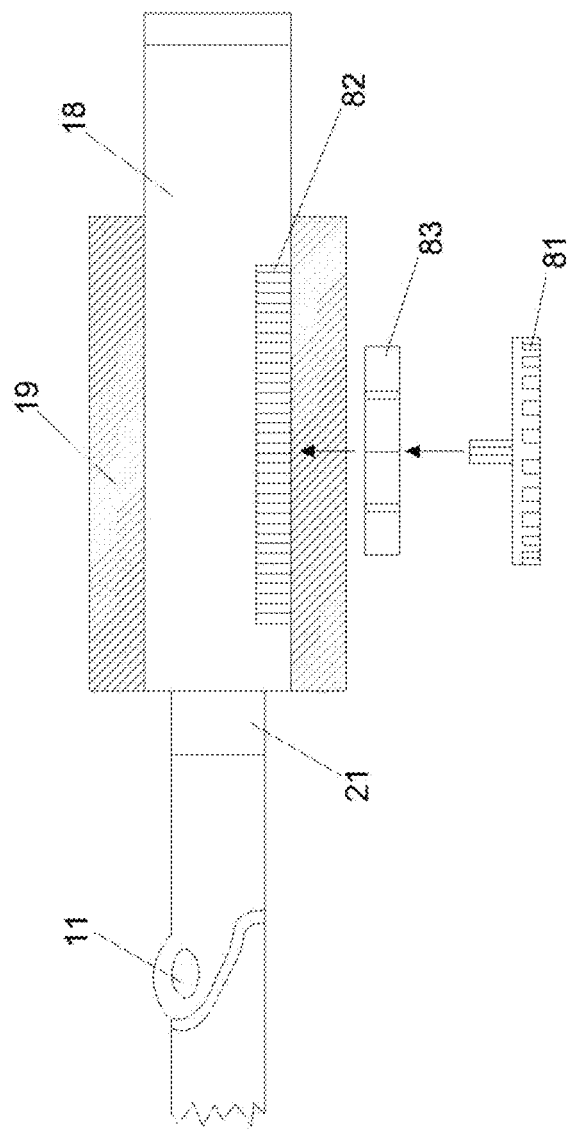
FIG. 9 is a cross-section view taken along line B-B' in FIG. 8.

FIGS. 8 and 9 further illustrate another schematic structural diagram of the movement of the movable body 18 relative to the first leg 19.

Structures similar to those of the first embodiment will not be repeated.

In this embodiment, a pinion and rack movement accommodation mechanism is used. As shown in FIGS. 8 and 9, the rack 82 is arranged on the movable body 18 in the plughole 12 of the first leg 19 to mesh with the pinion 83. The pinion 83 is adjusted by an external accommodation knob 81 to realize the accommodation of relative positions between the first leg 19 and the second leg 21.

When in use, the gear 83 is driven to rotate by rotating the accommodation knob 81, thereby driving the rack 82 to move back and forth. The rack 82 is integrated with the moving body 18, driving the continuous movement of the movable body 18 relative to the first leg 19, thereby fulfilling the relative accommodation from the primary position to the secondary position.

Third Embodiment

Figure 10:
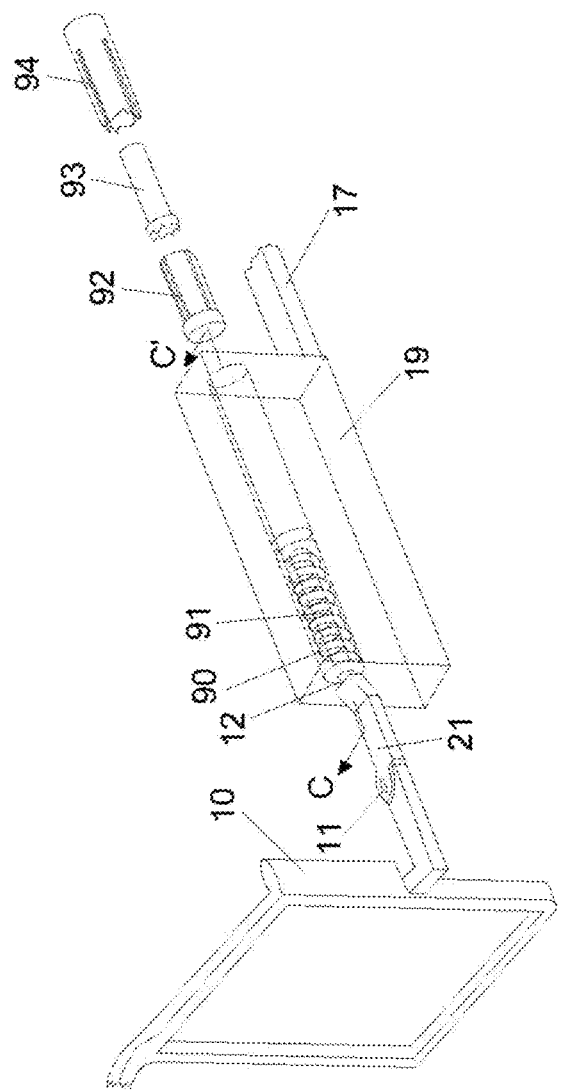
FIG. 10 is a partial exploded diagram of a third preferred embodiment of the present disclosure.
Figure 11:
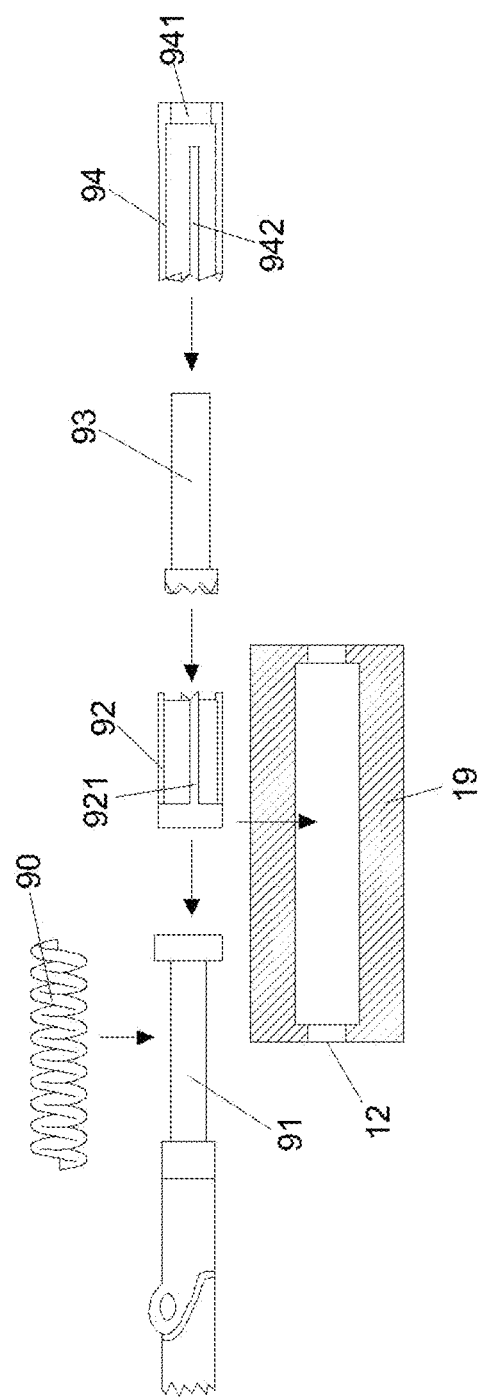
FIG. 11 is an exploded cross-section view taken along line C-C' in FIG. 10.

FIGS. 10 and 11 show a third schematic structural diagram of the movable body 18 moving relative to the first leg 19.

Those similar to the first and second embodiments will not be discussed again.

This embodiment includes a spring 90, a telescopic body 91, a turntable 92, a push rod 93 and a chute 94, forming a structure similar to that of a ballpoint pen. The telescopic body 91 is integrally connected with the second leg 21 and is arranged within the plughole 12 on the first leg 19. The width of the end of the telescopic body 91 is larger than the opening of the plughole 12 to prevent it from being detached from plughole 12. The spring 90 is sleeved on the telescopic body 91. The end of the telescopic body 91 is sleeved with a turntable 92. The outer circumferential surface of the turntable 92 is provided with a plurality of parallel second ribs 921 along the central axis of the telescopic body 91. A first end of the push rod 93 is sleeved within the grooves 94 and protruding out of the opening 941 of the chute 94. A second end of the push rod 93 is abutted against the turntable 92, and the chute 94 is provided with a plurality of one-way open and parallel chute openings 942. More specially, head of the push rod 93 is provided with a plurality of pointy protrusions, and a concave-convex meshing structure is provided on the opposite surfaces of both the turntable 92 and the chute 94.

When the push rod 93 protruding out from an end of the plughole 12 on the first leg 19 is pressed, the push rod 93 moves along the chute 94 to force the turntable 92 to move downward. When the turntable 92 and the chute are detached at a meshing position, the pointy protrusions at the head of the push rod contact with an oblique plane of the turntable 92 to generate radial force to force the turntable 92 to rotate. The telescopic body abutting against one end of the turntable is compressed, and the spring 90 at its outside the turntable is in the compressed state. At this point, the lens of the glasses of the present embodiment is in the primary position.

When the push rod 93 is pressed again, the pointy protrusions on the head of the push rod 93 are detached from the oblique plane of the turntable 92. The turntable 92 rotates under the radial force and overlaps with the meshing position of the chute 94. As the spring 90 is stretched, the lenses of the glasses of the present disclosure reach the secondary position.

For example, if the lens of $-10D$ is moved forward by 50 mm from the primary position to the secondary position, so, the effective degree of the lens obtained according to Equation (4) is denoted by the equation:

$$P_2 = P_1/(1 - d_2 P_1)$$
$$= (-10D)/(1 - [0.05 \times (-10D)])$$
$$= (-10D)/1.5D$$
$$= -6.67$$

In this way, the final $-6.67D$ obtained is 3.33D less than the previous $-10D$, which means that the required degree of focusing accommodation is reduced by $+3.33D$.

For another example, if the lens of $-8D$ is moved forward by 40 mm from the primary position to the secondary position, the effective degree of the lens obtained according to Equation (4) is denoted by the equation:

$$P_2 = P_1/(1 - d_2 P_1)$$
$$= (-8D)/(1 - [0.04 \times (-8D)])$$

$$= (-8D)/1.32D$$
$$= -6.06D$$

In this way, the final −6.06D obtained is 1.94D less than the previous −8D, which means that the required degree of focusing accommodation is reduced by +1.94D.

For another example, if the lens of −5D is moved forward by 60 mm from the primary position to the secondary position (as shown in FIG. 1), the effective degree of the lens obtained according to Equation (4) is denoted by the equation:

$$P_2 = P_1/(1 - d_2 P_1)$$
$$= (-5D)/(1 - [0.06 \times (-5D)])$$
$$= (-5D)/1.3$$
$$= -3.85D$$

In this way, the final −3.85D obtained is 1.15D less compared to the previous −5D, which means that the required degree of focusing accommodation is reduced by +1.15D.

From the above three examples, the glasses designed by applying the improved idea of the present embodiment can achieve the technical effect of retarding the progression of myopia, and specifically achieve the following benefits:

First, only one set of glasses is used, which means the cost is low. The glasses also has a regular appearance, is easy to use and safe. The same prescription lenses are used, pointing to high adaptability. There is also no optical distortion caused by the use of bifocal and progressive lenses, increasing comfort for wearers.

Second, the secondary position has a distinct appearance when the glasses are used, which helps parental supervision and improves compliance.

Third, this method provides the largest field of view without distortion and requires the shortest reading time compared to methods using only one set of fixed eyeglasses.

Fourth, the pushed-forward prescription myopia lens slightly shrinks the vision of the book, which visually causes the eye to read the book farther away, thus reducing the need for focusing accommodation of eyes.

Fifth, when the front frame and the myopia lens are moved forward, the user will move the book document forward to continue reading the full text. Increasing the reading distance of the document can reduce the pressure of the ciliary muscle inside the eyes for focusing accommodation and help slow down the progression of myopia.

Sixth, when the user keeps the head and body upright, the front frame and the myopia lens that are pushed out flat, as well as the upper frame edge of the front frame, remain at the original level of the primary position. It can help users to read more easily through the myopic lenses in the forward and upright front frame with minimal focusing accommodation of eyes and contraction force of the extraocular intortor at the same horizontal line of the eyes.

Seventh, when both the front frame and the myopia lens are moved forward, the light of the book will be affected by the lens moving forward, causing a base-down prism effect. The book seems to have moved forward a bit, thereby effectively reducing the need for eyes looking down, lowering the head and closer reading distance.

Eighth, when both the front frame and the myopia lens are moved forward, the light of the book will be affected by the lens moving forward, resulting in a base-inward prism effect. As a result, the user does not have to invert the eyes as much to maintain a binocular single vision. Due to the physiological mechanism of the pupillary accommodation reflex, focusing accommodation pressure is reduced while intortion need on intortor is reduced.

Ninth, when both the front frame and the myopia lens are moved forward to the secondary position, the light from the book vision becomes less radiated after passing through the lens, so the user can focus the vision of the book even by using a little less focusing accommodation demand.

Tenth, the distance vision at the secondary position when using the present embodiment is not unacceptably poor, so there is no need to move the front frame and the lens back to the primary position to see the distance, convenience is realized.

Figure 12:
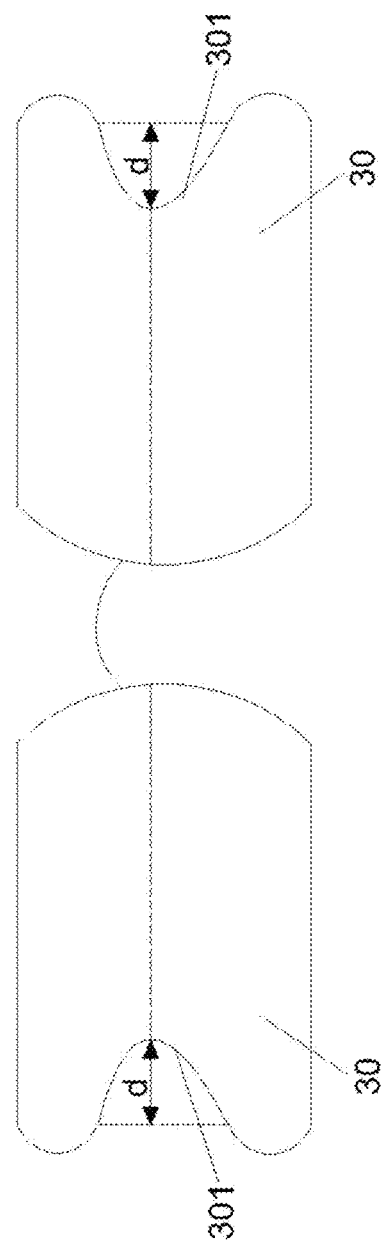
FIG. 12 is a schematic structural diagram of improvement on lenses according to the present disclosure.

In addition, FIG. 12 also shows the improved structure of the present embodiment on the left lens and the right lens. It should be noted that this improvement can be applied to the design of rimmed or rimless glasses. The shape of the lens is designed for the desired baseline length so that when reading, peripheral images that do not pass through the lens 10 are focused directly on the peripheral retina (to offset the hyperopic defocus defect of peripheral retina).

As can be seen from the figure, the outer edges of the left lens 302 and the right lens 301 are symmetrically provided with recesses 301 inwardly along the baseline direction indicated by the dotted line (only one is shown in the figure, the other side is the same). The depth range between the recess 301 and the corresponding outer edge is d, and the value range of d is:

$$70 \text{ mm} < d < 100 \text{ mm}$$

With this structure, less accommodation is required in the secondary position than when reading in the primary position because the effect of degree of the lens edge is reduced.

The above idea can also be applied to form a plurality of recesses on the side of the lens and placing them in different positions as shown in the figure, which can also achieve the accommodation effect.

The foregoing description of the preferred embodiments is provided to enable any person skilled in the art to use or utilize the present disclosure. Various modifications to these embodiments will be readily apparent to those skilled in the art, and the general principles described herein may be applied to other embodiments without creativity steps. Thus, the present disclosure is not to be limited to the embodiments shown herein but should be accorded the widest scope consistent with the principles and novel features disclosed herein.

The invention claimed is:

1. Glasses for retarding myopia progression, comprising lenses, a frame, and glasses legs, wherein the lenses are fixedly installed on the frame, wherein each of the glasses legs comprises a first leg and a second leg, the second leg is connected between the frame and the first leg, the second leg is movable telescopically in relation to the first leg, in movement of the frame relative to eyeballs from a primary position to a secondary position stretched, a relationship between an effective degree and a lens degree is denoted by:

$$P_2 = P_1/(1-d_2 P_1)$$

wherein $P_1$ is an actual lens degree at the primary position, $P_2$ is an effective lens degree at the secondary position, and $d_2$ is a spacing between the primary position and the secondary position, the spacing meets:

$$0 < d_2 < 60 \text{ mm},$$

wherein the lenses comprise a left lens and a right lens, wherein a plurality of recesses are formed at outer side edges of both the left lens and the right lens, wherein the first leg comprises a plughole arranged at a front end of the first leg, the second leg is telescopically arranged at a first end of the plughole, wherein the glasses further comprise a movable body embedded at a second end of the plughole, the second leg is arranged within the plughole and connected to the movable body, wherein the plughole further comprises a spring, a telescopic body, a turntable, a push rod and a chute, the telescopic body is connected with the second leg as a whole, a width of the telescopic body is larger than a width of an opening of the plughole, the spring is sleeved on the telescopic body, an end of the telescopic body is sleeved with the turntable, an outer circumferential surface of the turntable is provided with a plurality of parallel second ribs along a central axis of the turntable, a first end of the push rod is sleeved within the chute and protruding out of an opening of the chute, a second end of the push rod abuts against the turntable, the chute is arranged with a plurality of one-way open and parallel chute openings, a head of the push rod is provided with a plurality of pointy protrusions, and a concave-convex meshing structure is provided on opposite surfaces of both the chute and the turntable, and wherein, by pressing the push rod protruding out of an end of the plughole, the push rod moves along the chute to force the turntable to move downward; when the turntable and the chute are detached at a meshing position, the pointy protrusions at the head of the push rod contact with an oblique plane of the turntable to generate a radial force, so as to drive the turntable to rotate, the telescopic body abutting against one end of the turntable is compressed, the spring outside the turntable is in a compressed state, the frame is in the primary position; when the push rod is pressed again, the pointy protrusions of the head of the push rod are detached from the oblique plane of the turntable, the turntable rotates under the radial force, the turntable and the chute are overlapped at the meshing position; along with a stretching of the spring, the frame reaches the secondary position.

\* \* \* \* \*